(12) United States Patent
Marzahn et al.

(10) Patent No.: US 9,685,260 B2
(45) Date of Patent: Jun. 20, 2017

(54) METHOD OF COOLING A SUPERCONDUCTIVE CABLE

(71) Applicant: NEXANS, Paris (FR)

(72) Inventors: Erik Marzahn, Langenhagen (DE); Mark Stemmle, Hannover (DE); Beate West, Garbsen (DE)

(73) Assignee: NEXANS, Paris (FR)

( * ) Notice: Subject to any disclaimer, the term of this patent is extended or adjusted under 35 U.S.C. 154(b) by 178 days.

(21) Appl. No.: 14/176,338

(22) Filed: Feb. 10, 2014

(65) Prior Publication Data

US 2014/0235449 A1 Aug. 21, 2014

(30) Foreign Application Priority Data

Feb. 20, 2013 (EP) .................................... 13290033

(51) Int. Cl.
*H01B 12/16* (2006.01)
*H02G 3/03* (2006.01)
*H02G 15/34* (2006.01)

(52) U.S. Cl.
CPC .............. *H01B 12/16* (2013.01); *H02G 3/03* (2013.01); *H02G 15/34* (2013.01); *Y02E 40/647* (2013.01); *Y02E 40/648* (2013.01)

(58) Field of Classification Search
CPC .......... H02G 3/03; H02G 15/34; H01B 12/16; Y02E 40/647; Y02E 40/648
See application file for complete search history.

(56) References Cited

U.S. PATENT DOCUMENTS

| 3,800,062 A | 3/1974 | Kataoka et al. | |
|---|---|---|---|
| 2002/0134533 A1* | 9/2002 | Bechis | H02G 15/34 165/104.19 |
| 2010/0126748 A1* | 5/2010 | Traeholt | H02G 15/34 174/15.5 |
| 2011/0160063 A1* | 6/2011 | Soika | F16L 59/065 505/163 |

FOREIGN PATENT DOCUMENTS

| EP | 2200048 | 6/2010 | |
|---|---|---|---|
| FR | EP 2200048 A1 * | 6/2010 | ............. H01B 12/16 |

* cited by examiner

*Primary Examiner* — Emmanuel Duke
(74) *Attorney, Agent, or Firm* — Sofer & Haroun, LLP

(57) ABSTRACT

A method of cooling at least one superconductive cable is disclosed which is arranged in a cryostat having at least one thermally insulated pipe with a free space surrounded by the pipe, wherein the cable and at least one tubular structure are arranged in the free space, and wherein a cooling agent is conducted through the free space from a feeding point located at one end to a distal end. The cooling agent is conducted through the cryostat and the tubular structure exclusively in one direction of the cable until it reaches its temperature of operation and is discharged to the outside at the distal end. After reaching the temperature of operation, the cooling agent is returned from the distal end of the arrangement through the tubular structure to the feeding point.

Figure 1:
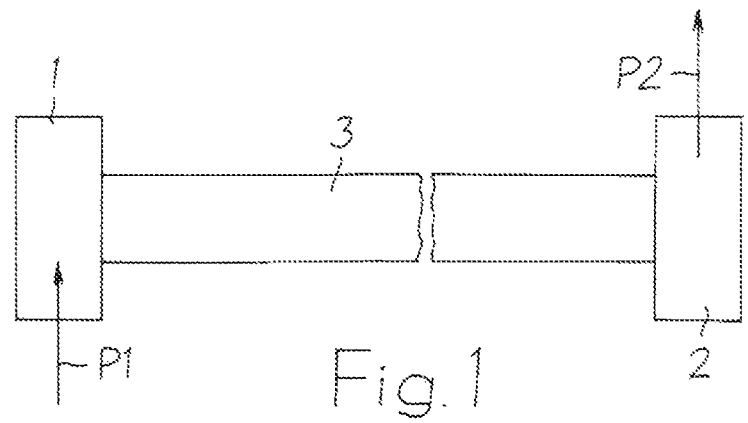

4 Claims, 1 Drawing Sheet

METHOD OF COOLING A SUPERCONDUCTIVE CABLE

RELATED APPLICATION

This application claims the benefit of priority from European Patent Application No. 13 290 033.3, filed on Feb. 20, 2013, the entirety of which is incorporated by reference.

BACKGROUND

Field of the Invention

The invention relates to a method of cooling at least one superconductive cable which is arranged in a cryostat having at least one thermally insulated pipe in a free space surrounded by the pipe, wherein the cable and at least one tubular structure are arranged in the free space and through which a cooling agent is conducted to a distal end from a feeding point located at an end.

Such a method is disclosed, for example, in EP 2 200 048 A1.

Description of Related Art

In today's technology, a superconductive cable includes an electrical conductor composed of a composite material which contains ceramic material which at sufficiently low temperatures changes over into the superconductive state. The electrical direct current resistance of an appropriately constructed conductor is zero with sufficient cooling as long as a certain current level is not exceeded. Suitable ceramic materials are, for example, materials doped with rare earths which have become known under the name ReBCO (rare-earth-barium-copper oxide), wherein YBCO (yttrium-barium-copper oxide) are particularly among these materials. Another of these superconductive materials is, for example, BSCCO (bismuth-strontium-calcium-copper oxide). Sufficiently low temperatures for bringing such a material into the superconductive state are, for example, between 67K and 110K. Suitable cooling agents are, for example, nitrogen, helium, neon and hydrogen or mixtures of these materials.

U.S. Pat. No. 3,800,062 A describes a method for operating a plant with superconductive cables. In the enclosure, for example, three superconductive cables with a pipe shaped core are arranged in a cryostat. A cooling agent supplied from a cooling station is fed into the cryostat at an end thereof and is returned as a heated cooling agent from the distal end of the cryostat through a separate pipe or a second cryostat to the cooling station. The heated cooling agent can additionally be returned with a special pipe system through sections of the tubular cores of the cables which are connected with the use of locks or stops at various locations to the separate pipe or the second cryostat.

A method as it is described above is disclosed by, for example, from EP 2 200 048 A1. This reference shows an arrangement with a superconductive cable which is surrounded by a cryostat for conducting a cooling agent through a free space thereof. The cryostat consists of two concentrically arranged metal pipes between which is arranged a vacuum insulation. Also arranged in the free space of the cryostat is a pipe through which a cooling agent, which has been fed into the cryostat at the near end, can be returned from the distal end of the arrangement. The cooling agent becomes warmer already in the free space of the cryostat during its return from the distal end of the arrangement. Another heating occurs during the return through the pipe with a corresponding return action on the cooling agent introduced into the cryostat at the feeding point. The efficiency of the cooling action is generally negatively influenced as a result.

OBJECTS AND SUMMARY

The invention is based on the object of improving the efficiency of the above described method during cooling of the superconductive cable to the temperature of operation. In accordance with the invention, this object is met in that the cooling agent is conducted exclusively in one direction through the cryostat and the tubular structure until the cable is cooled to is temperature of operation and is discharged to the outside at the distal end, and that the cooling agent is returned after reaching the temperature of operation from the distal end of the arrangement through the tubular structure to the feeding point.

When using this method, the cooling agent is fully effective because it is only insignificantly heated by the external heat. Therefore, the superconductive cable can be cooled with high efficiency as quickly as possible to its temperature of operation. For this purpose, the cooling agent can only be conducted through the free space enclosed by the cryostat. The tubular construction remains unutilized. However, it is also possible to additionally conduct the cooling agent through the tubular structure until the temperature of operation of the cable has been reached, particularly in the same direction as through the free space of the cryostat. In this connection, the cooling agent is discharged at the distal end to the outside. After reaching the temperature of operation of the superconductive cable, the cooling agent is returned to the feeding point from the distal end of the arrangement through the tubular structure. A tubular core of the superconductive cable may serve as the tubular structure. However, it is also possible to arrange a separate pipe as the tubular structure in the cryostat.

The method according to the invention will be explained with the aid of the drawings in embodiments.

BRIEF DESCRIPTIONS OF THE DRAWINGS

In the drawings:

FIG. 1 schematically shows an arrangement for carrying out the method according to the invention.

Figure 2:
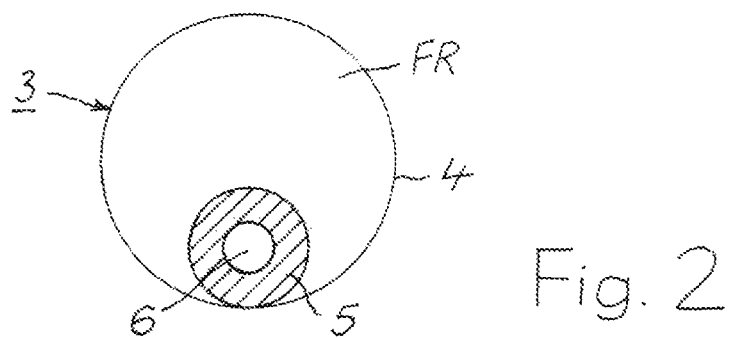
Figure 3:
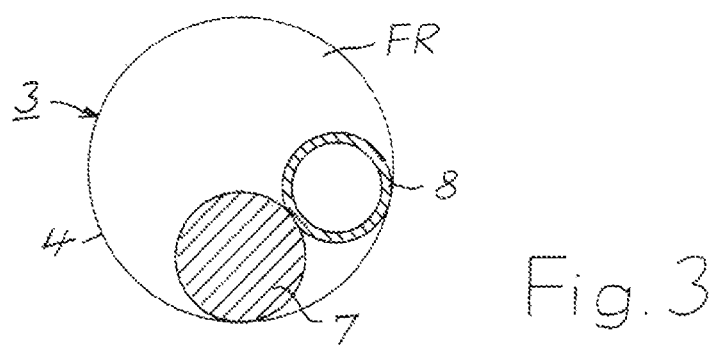

FIGS. 2 and 3 are cross sectional views of two differently constructed arrangements according to FIG. 1.

DETAILED DESCRIPTION

The arrangement purely schematically illustrated in FIG. 1 has two end closures 1 and 2 between which a cryostat 3 is arranged. The cryostat 3 encloses at least one of the superconductive cables shown in FIGS. 2 and 3. The end closure 2 could also be a connecting point at which two cryostats containing superconductive cables are connected to each other.

The cryostat 3 is indicated in FIGS. 2 and 3 only by a circle 4. In a simple embodiment, the cryostat may be a thermally insulated pipe which advantageously consists of metal, particularly of high grade steel. However, the pipe can also consist of synthetic material. It is surrounded externally by at least one layer of a thermally active insulating material. In accordance with a preferred embodiment, the cryostat 3 consists of two pipes of metal, preferably high grade steel, which are arranged at a distance concentric to each other, between which a spacer and a vacuum insulation are located.

In both embodiments of the cryostat 3, the pipes can be undulated transversely of their longitudinal direction.

In accordance with FIG. 2, a superconductive cable 5 is arranged in the cryostat 3, wherein the cryostat may have a tubular core 6. The construction of the cable 5 can be carried out in all possible and conventional environments. Accordingly, this construction will not be discussed further. The cryostat 3 encloses a free space FR for conducting a cooling agent therethrough, wherein the cable 5 is also arranged in the free space. It is also possible to arrange two or more superconductive cables in the cryostat 3, wherein at least one of which has a tubular core 6.

Taking into consideration FIGS. 1 and 2, the method according to the invention is carried out, for example, as follows:

A coolant, for example, cold nitrogen gas, is fed into the arrangement at the end closure 1 in accordance with arrow P1 and is conducted through, the free space FR of the cryostat 3 up to the end closure 2. At this location, the cooling agent is discharged to the outside in accordance with arrow P2. This manner of operation is carried out until the superconductive cable 5 is cooled to its temperature of operation, for example, 77K. The tubular core 6 of the cable 5 can initially be unused as the method is carried out. However, for accelerating the cooling process it is also possible and useful to conduct the cooling agent also through the core 6, particularly through the free space FR from the end closure 1 to the end closure 2.

After reaching the temperature of operation of the cable 5, the cooling agent is, for its further cooling, conducted only through the free space FR and returned from the end closure 2 through the core 6 of the cable 5 to the end closure 1. It is conducted away at this point and is once again cooled to the temperature required for cooling the superconductive cable 5.

In accordance with an embodiment of the invention according to FIG. 3, in addition to a superconductive cable 7, a separate pipe 8 is arranged in the cryostat 3 or its free space FR. After carrying out the method according to the invention with an arrangement according to FIG. 3, in analogy to the method described in connection with FIG. 1, a cooling agent is conducted up to the cooling of the cable 7 to its temperature of operation only through the free space FR or simultaneously also through the pipe 8 from end closure 1 to end closure 2. Also in this embodiment of the arrangement, two or more super conductive cables may be arranged in the cryostat 3. In analogy to the method described in connection with FIG. 2, after reaching the temperature of operation of the cable 7, the cooling agent is returned from the end closure 2 through the pipe 8 to the end closure 1.

The invention claimed is:

1. Method of cooling at least one superconductive cable, where the cable is arranged in a cryostat made of at least one thermally insulated pipe, with the cryostat having a free space surrounded by the pipe, where the cable, and optionally at least one tubular structure, are both arranged in the free space of the cryostat, and where a cooling agent is conducted from a feeding point located at one end up to a distal end of the cryostat, said method comprising the steps of:

the cooling agent is first conducted exclusively in one direction through the either one of the cryostat and the optional tubular structure if contained therein, until the cable is cooled to an operating temperature, the cooling agent being discharged temporarily to the outside of the cryostat at the distal end, and after said cable reaches said operating temperature, the cooling agent is returned to said feeding point first by being introduced back into said distal end of the arrangement, and then being passed back through the cryostat to the feeding point.

2. The method according to claim 1, wherein the cryostat has the optional tubular structure, wherein the cooling agent is returned through the tubular structure after reaching the operating temperature from the distal end of the arrangement to the feeding point.

3. The method according to claim 1, wherein, said tubular structure is a separate pipe.

4. The method according to claim 1, wherein said operating temperature is substantially 70K to 80K.

* * * * *